(12) United States Patent
Fujii

(10) Patent No.: US 9,333,795 B2
(45) Date of Patent: May 10, 2016

(54) OIL-BASED INK COMPOSITION FOR BALL-POINT PEN, AND OIL-BASED BALL-POINT PEN REFILL USING THE SAME

(71) Applicant: KABUSHIKI KAISHA PILOT CORPORATION, Tokyo-to (JP)

(72) Inventor: Takeshi Fujii, Kanagawa-ken (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 0 days.

(21) Appl. No.: 14/383,304

(22) PCT Filed: Mar. 1, 2013

(86) PCT No.: PCT/JP2013/055728
§ 371 (c)(1),
(2) Date: Sep. 5, 2014

(87) PCT Pub. No.: WO2013/133180
PCT Pub. Date: Sep. 12, 2013

(65) Prior Publication Data
US 2015/0023720 A1  Jan. 22, 2015

(30) Foreign Application Priority Data

Mar. 7, 2012 (JP) .................................. 2012-050167

(51) Int. Cl.
*B43K 7/00* (2006.01)
*B43K 7/10* (2006.01)
(Continued)

(52) U.S. Cl.
CPC ... *B43K 7/10* (2013.01); *B43K 1/08* (2013.01); *B43K 1/082* (2013.01); *B43K 1/084* (2013.01);
(Continued)

(58) Field of Classification Search
CPC .......... B43K 1/082; B43K 1/084; B43K 7/00; B43K 7/10
USPC ....................................................... 401/216
See application file for complete search history.

(56) References Cited

U.S. PATENT DOCUMENTS 4,116,569 A * 9/1978 Reed et al. ..................... 401/216
5,104,249 A * 4/1992 Elsner et al. ................... 401/216
(Continued)

FOREIGN PATENT DOCUMENTS

EP  1 473 342  11/2004
JP  5-320558  12/1993
(Continued)

OTHER PUBLICATIONS

International Preliminary Report on Patentability issued Sep. 9, 2014 in corresponding International Application No. PCT/JP2013/055728.
(Continued)

*Primary Examiner* — Jennifer C Chiang
*Assistant Examiner* — Joshua Wiljanen
(74) *Attorney, Agent, or Firm* — Wenderoth, Lind & Ponack, L.L.P.

(57) ABSTRACT

Provided are: an oil-based ink composition for a ball-point pen having a favorable feeling of writing, the favorable deepness of a written trace, favorable light resistance, favorable ink stability over time, and favorable pigment dispersibility; and an oil-based ball-point pen refill using the oil-based ink composition. An oil-based ink composition for a ball-point pen comprising at least a dye, a pigment, and an organic solvent, wherein the dye is at least one salt-forming dye selected from the group consisting of salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes.

19 Claims, 2 Drawing Sheets

(51) Int. Cl.
   *B43K 7/02* (2006.01)
   *B43K 1/08* (2006.01)
   *C09D 11/18* (2006.01)
   *C08K 3/04* (2006.01)
   *C08K 5/05* (2006.01)
   *C08K 5/1545* (2006.01)
   *C08K 5/3417* (2006.01)
   *C09D 137/00* (2006.01)
   *C09D 11/17* (2014.01)

(52) U.S. Cl.
   CPC ... *B43K 7/02* (2013.01); *C08K 3/04* (2013.01); *C08K 5/05* (2013.01); *C08K 5/1545* (2013.01); *C08K 5/3417* (2013.01); *C09D 11/17* (2013.01); *C09D 11/18* (2013.01); *C09D 137/00* (2013.01); *B43K 7/00* (2013.01)

(56) References Cited

U.S. PATENT DOCUMENTS

| | | | |
|---|---|---|---|
| 6,830,611 B2 | 12/2004 | Ichikawa et al. | |
| 7,381,754 B2 | 6/2008 | Ichikawa et al. | |
| 2003/0075074 A1* | 4/2003 | Ichikawa et al. | 106/31.43 |
| 2011/0271870 A1 | 11/2011 | Otsubo et al. | |

FOREIGN PATENT DOCUMENTS

| | | |
|---|---|---|
| JP | 8-134393 | 5/1996 |
| JP | 9-71745 | 3/1997 |
| JP | 9-165542 | 6/1997 |
| JP | 9-183934 | 7/1997 |
| JP | 2003-41170 | 2/2003 |
| JP | 2010-285479 | 12/2010 |
| JP | 2011-126188 | 6/2011 |
| JP | 2011-137106 | 7/2011 |
| JP | 2011-195833 | 10/2011 |
| JP | 2012-012475 | 1/2012 |
| JP | 2013-28788 | 2/2013 |
| WO | 02/24821 | 3/2002 |

OTHER PUBLICATIONS

International Search Report issued Apr. 23, 2013 in corresponding International Application No. PCT/JP2013/055728.

Extended European Search Report issued Sep. 3, 2015 in corresponding European Application No. 13757079.2.

* cited by examiner

OIL-BASED INK COMPOSITION FOR BALL-POINT PEN, AND OIL-BASED BALL-POINT PEN REFILL USING THE SAME

TECHNICAL FIELD

The present invention relates to oil-based ink compositions for ball-point pens, and further specifically relates to an oil-based ink composition for a ball-point pen that is excellent in ink stability over time and in a feeling of writing, offers a deep-colored written trace, and has favorable light resistance and to an oil-based ball-point pen refill using the oil-based ink composition.

BACKGROUND ART

As oil-based ink compositions for ball-point pens, many oil-based ink compositions for ball-point pens using, as coloring agents, various dyes such as nigrosine-based dyes, basic dyes, and acid dyes as well as types of dyes, in which the various dyes have been processed, have been conventionally proposed.

Various coloring agents have been used in such oil-based ink compositions for ball-point pens, an oil-based ink composition for a ball-point pen using a nigrosine-based dye is disclosed in Patent Literature 1 (Title of the Invention: "OIL-BASED BLACK INK"), an oil-based ink composition for a ball-point pen using a salt-forming dye of a triarylmethane-based basic dye and an azo yellow acid dye is disclosed in Patent Literature 2 (Title of the Invention: "OIL-BASED BLACK INK") or Patent Literature 3 (Title of the Invention: "OIL-BASED BLACK INK"), and an oil-based ink composition for a ball-point pen using a salt-forming dye based on a basic dye is disclosed in Patent Literature 4 (Title of the Invention: "OIL-BASED BLACK INK COMPOSITION FOR BALL-POINT PEN") or the like.

CITATION LIST

Patent Literature

Patent Literature 1: Japanese Patent Laid-Open No. 5-320558
Patent Literature 2: Japanese Patent Laid-Open No. 9-165542
Patent Literature 3: Japanese Patent Laid-Open No. 9-71745
Patent Literature 4: Japanese Patent Laid-Open No. 8-134393

SUMMARY OF INVENTION

Technical Problem

Patent Literature 1 discloses the ink composition in which the nigrosine-based dye is used as a coloring agent. Although such an ink composition has been conventionally used because of having advantages of high concentration and a low cost, the ink composition has been susceptible to improvement in view of ink stability over time because of having poor solubility in an organic solvent.

Further, Patent Literature 2 or 3 discloses the ink composition in which the salt-forming dye of the triarylmethane-based basic dye and the azo yellow acid dye is used as a coloring agent. Such an ink composition has had points to be improved that, e.g., the salt-forming dye is partially decomposed over a long period, precipitates are generated, and a feeling of writing becomes inferior.

Further, Patent Literature 4 discloses the ink composition in which the salt-forming dye based on the basic dye is used as a coloring agent. Although such an ink composition has had favorable ink stability over time, it has been desired that the ink composition is further improved in light resistance and allowed to offer a deeper-colored written trace. Since such an ink composition has tended to generally have a comparatively high ink viscosity, it has been also examined to improve a feeling of writing by further incorporating a surfactant or the like as a lubricant in order to allow the feeling of writing to be favorable. However, there has been a problem of a fear that the surfactant and the dye react with each other and a precipitate may be generated.

Incidentally, it has been desired to decrease the viscosity of an oil-based ball-point pen refill in order to improve a feeling of writing. However, when the viscosity of an ink has been decreased in order to fill such a need, a lubrication state between a ball and a tip body has tended to be allowed to be from fluid lubrication or mixture lubrication to boundary lubrication, and the ball or the tip body has tended to be easily worn.

An object of the present invention is to provide an oil-based ink composition for a ball-point pen that is excellent in ink stability over time and in a feeling of writing, offers a deep-colored written trace, and has favorable light resistance and to provide an oil-based ball-point pen refill using the oil-based ink composition.

Solution to Problem

In order to solve the above-described problems, the present invention is as follows:

"1. An oil-based ink composition for a ball-point pen comprising at least a dye, a pigment, and an organic solvent, wherein the dye is at least one salt-forming dye selected from the group consisting of salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes.

2. The oil-based ink composition for a ball-point pen according to Clause 1, wherein the alkylbenzene sulfonic acid is dodecyl diphenyl oxide disulfonic acid.

3. The oil-based ink composition for a ball-point pen according to Clause 1 or Clause 2, wherein the pigment is a basic carbon black.

4. The oil-based ink composition for a ball-point pen according to any one of Clause 1 to Clause 3, further comprising a polyvinyl butyral resin in which a hydroxyl group in a molecule is 20 to 40 mol %.

5. The oil-based ink composition for a ball-point pen according to any one of Clause 1 to Clause 4, wherein the oil-based ink composition for a ball-point pen has a pH of 7 to 10.

6. The oil-based ink composition for a ball-point pen according to any one of Clause 1 to Clause 5, wherein the oil-based ink composition for a ball-point pen further comprises a salt-forming dye of an acid dye and an aromatic ring amine.

7. The oil-based ink composition for a ball-point pen according to Clause 6, wherein the aromatic ring amine is one or more selected from the group consisting of benzoxonium compounds, alkyl dimethyl benzyl ammonium compounds, and alkyl diethyl benzyl ammonium compounds.

8. The oil-based ink composition for a ball-point pen according to any one of Clause 1 to Clause 7, wherein an ink viscosity at 20° C. and a shear rate of 500 sec$^{-1}$ is 5000 mPa·s or less.

9. An oil-based ball-point pen refill comprising a ball-point pen tip including, in a tip body, a ball holding chamber, an ink circulation hole formed in a center of a bottom wall of the ball holding chamber, and a plurality of ink circulation grooves that radially extend from the ink circulation hole, in which a leading end portion of the tip is inwardly crimped, whereby a part of a ball is allowed to protrude from the leading edge of the tip and is rotatably held, the ball-point pen tip being mounted on a leading end of an ink accommodation cylinder directly or via a tip holder, and the oil-based ink composition for a ball-point pen according to any one of Clause 1 to Clause 8 being directly accommodated in the ink accommodation cylinder, wherein a curved surface-shaped abutting surface having a curvature different from the curvature of the ball is disposed on the bottom wall of the ball holding chamber, the ball abuts on an abutment which is a part of the abutting surface; and a first gap that is gradually downsized from a portion closer to the ink circulation hole is formed from the portion closer to the ink circulation hole to the abutment, and a second gap that is gradually downsized from a part closer to a leading end of the ink circulation grooves is formed from the part closer to the leading end of the ink circulation grooves to the abutment, between the ball and the abutting surface.

10. The oil-based ball-point pen refill according to Clause 9, wherein a lubrication coating layer is disposed on a surface of the ball and/or on a surface of the abutting surface."

Advantageous Effects of Invention

The present invention was able to provide an oil-based ink composition for a ball-point pen, in which a dye and a pigment are stable in an ink, and which is excellent in a feeling of writing, offers a deep-colored written trace, and has favorable light resistance, and to provide an oil-based ball-point pen refill using the oil-based ink composition.

DESCRIPTION OF EMBODIMENTS

Figure 1:
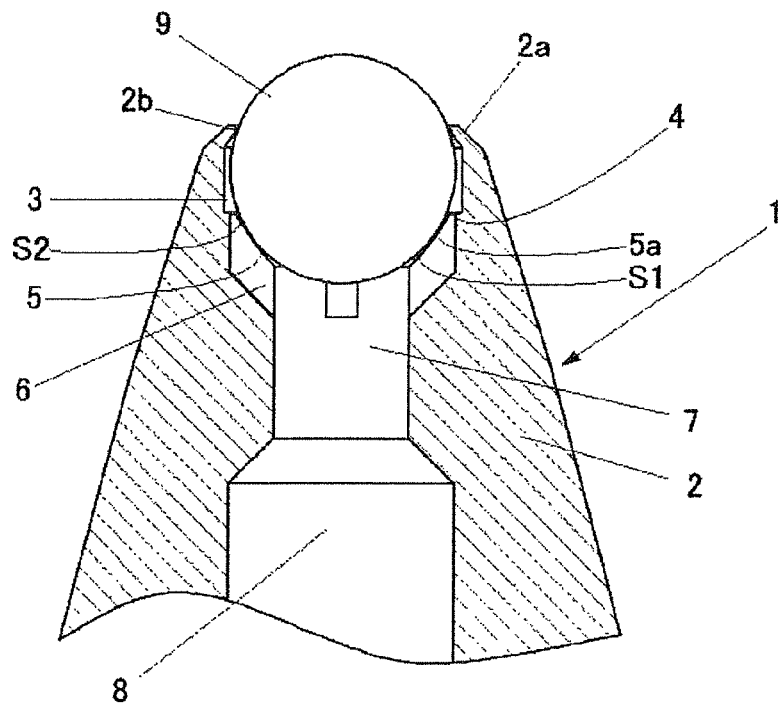
FIG. 1 is a longitudinal cross-sectional view illustrating a ball-point pen tip of Example 1.

One feature of the present invention is in that an oil-based ink composition for a ball-point pen comprises a dye, a pigment, and an organic solvent, wherein the dye is at least one salt-forming dye (hereinafter may be referred to as a first salt-forming dye) selected from the group consisting of salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes. Such a constitution enables provision of the ink composition that has a favorable feeling of writing, offers a deep-colored written trace, has favorable light resistance, and further provides an ink that is stable over time.

In the present invention, it is essential to use, as the dye, a dye selected from any one or more salt-forming dyes from the group consisting of salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes. Basic dyes include xanthene-based, triarylmethane-based, azomethine-based, azo-based, anthraquinone-based, and oxazine-based dyes, and the like, and of these, a xanthene-based basic dye, a triarylmethane-based basic dye, or an azomethine-based basic dye is subjected to neutralizing reaction with an alkylbenzene sulfonic acid to form a salt-forming dye having high ionic bonding strength between the alkylbenzene sulfonic acid and the basic dye, whereby ink stability over time can be kept in an oil-based ink for a long term under various environments.

Xanthene-based basic dyes that can be used in the present invention include C.I. Basic Red 1, 1:1, C.I. Basic Violet 10, 11, and Solvent Red 49. Further, triarylmethane-based basic dyes that can be used in the present invention include C.I. Basic Blue 1, 7, 19, 26, C.I. Basic Violet 1, 3, 4, 10, 15, C.I. Basic Green 1, 4, 7, Solvent Blue 5, and Solvent Violet 8. Furthermore, azomethine-based basic dyes that can be used in the present invention include C.I. Basic Yellow 28, 11, 13, 14, 21, 23, 24, 28, 40, 44, 49, 51, 52, and 53.

Further, it is presumed that the salt-forming dye has not only the effect of a coloring agent but also the effect of suppressing metal-to-metal contact between a ball and a tip body by forming a lubricating film in which a phenylsulfone or phenyl group in the salt-forming dye is easily adsorbed on a metal, and allows lubricity to be improved, a feeling of writing to be favorable, and the wear of the tip body to be suppressed. Therefore, it is presumed that unlike conventionally known dyes, the salt-forming dye can have both effects of a coloring agent and a lubricant.

However, only single use of the salt-forming dye may result in the insufficient light resistance of a written trace, and therefore, the light resistance can be improved by using a pigment in combination. Further, the use of the pigment tends to allow pigment particles to enter a gap between the ball and the tip body, whereby metal-to-metal contact is suppressed to improve lubricity. Furthermore, as mentioned above, a lubricant layer is formed with a phenylsulfone or phenyl group in the salt-forming dye, metal-to-metal contact is more suppressed by an interaction between the lubricant layer and the pigment particles due to the salt-forming dye, lubricity is improved, and a feeling of writing and the suppression of wear of the tip body are enabled.

Further, alkylbenzene sulfonic acids include dodecyl diphenyl oxide disulfonic acid, dodecyl benzene sulfonic acid, and the like, and dodecyl diphenyl oxide disulfonic acid having many sulfo groups (—SO$_3$H) is preferred in consideration of improvement of lubricity.

Furthermore, each salt-forming dye of an alkylbenzene sulfonic acid and a xanthene-based basic dye, an alkylbenzene sulfonic acid and a triarylmethane-based basic dye, or an alkylbenzene sulfonic acid and an azomethine-based basic dye may be produced to use two or more salt-forming dyes in combination. From the viewpoint of lubricity, use of two or more salt-forming dyes in combination is preferable, and use of three or more salt-forming dyes in combination is most preferable.

Further, since desired lubricity tends to be deteriorated when the content of the salt-forming dye is less than 0.1 mass % with respect to the total amount of the ink composition while the temporal stability of the ink composition tends to be deteriorated when the content of the salt-forming dye is more than 40.0 mass %, it is preferable that the content of the salt-forming dye is 0.1 to 40.0 mass % with respect to the total amount of the ink composition. The content of the salt-forming dye is more preferably 3.0 to 30.0 mass %, most preferably 10.0 to 30.0 mass %, with respect to the total amount of the ink composition.

Further, pigments include inorganic, organic, and processed pigments, and the like. More specific examples thereof include carbon black, aniline black, ultramarine blue, chrome yellow, titanium oxide, iron oxide, phthalocyanine-based, azo-based, quinacridone-based, DPP-based, quinophthalone-based, threne-based, triphenylmethane-based, perinone-based, perylene-based, and dioxazine-based pigments, metallic pigments, pearl pigments, fluorescent pigments, phosphorescent pigments, and the like. These pigments have the function of entering a gap between a ball and a tip body to suppress metal-to-metal contact and to improve lubricity. Further, the average particle diameter of the pigment is preferably 300 nm or less, more preferably 150 nm or less, in view of a flow path for the ink composition in the tip. As used herein, the average particle diameter refers to an average particle diameter d50 by a particle size distribution measuring apparatus. These pigments may be used singly or in combination of two or more kinds. The content of the pigment is preferably 0.5 to 15.0 mass % with respect to the total amount of the ink composition. This is because a lubricating effect tends to be inhibited from being obtained when the content of the pigment is less than 0.5 mass % while pigment particles tend to easily agglomerate in the ink composition when the content is more than 15.0 mass %, the content is preferably 2.0 to 10.0 mass %, most preferably 3.0 to 7.0 mass %.

The ink composition according to the present invention may contain a pigment dispersing agent. Such a pigment dispersing agent can be exemplified by a polyvinyl butyral resin, a polyacetal resin, a polyvinyl alcohol resin, a cellulosic resin, polyvinyl pyrrolidone, or the like, and one or two or more of them may be used. Of these, the polyvinyl butyral resin is preferred, and this is because it is easy to immediately and finely disperse the polyvinyl butyral resin in an organic solvent, and further because it is easy to maintain long-term dispersion of a pigment due to adsorption of the polyvinyl butyral resin on the pigment. Of the pigments, a basic carbon black is particularly preferred in consideration of pigment dispersibility with a polyvinyl butyral resin. As used herein, a basic carbon black, in which carbon black particles are dispersed in ion-exchanged water having a pH of 7, and which has a pH value of 7 or more measured at 25° C. with a pH meter, is defined as the basic carbon black. In consideration of pigment dispersibility, a basic carbon black having pH value of 7 to 10 is most preferred.

Further, the polyvinyl butyral resin is obtained by allowing a polyvinyl alcohol (PVA) to react with butyl aldehyde (BA), and the rate of unreacted remaining hydroxyl groups (hereinafter referred to as remaining hydroxyl groups) to hydroxyl groups derived from PVA molecules is preferably 20 to 40 mol % in the polyvinyl butyral resin. This is because less than 20 mol % of the remaining hydroxyl groups results in a tendency to inhibit dissolution in an alcohol-based organic solvent while more than 40 mol % thereof results in a tendency to be prone to cause poor water resistance, and, in addition, more preferably, the remaining hydroxyl groups are preferably 30 to 40 mol %. Further, in consideration solubility in an organic solvent, a molecular weight of 100,000 or less is preferable, and a molecular weight of 30,000 or less is more preferable.

Since pigment dispersibility is prone to be poor when the content of the pigment dispersing agent is less than 0.1 mass % while the dispersing agent is prone to precipitate in the ink composition and the viscosity of the ink composition is also prone to become higher when the content is more than 20.0 mass %, the content is preferably 1.0 to 20.0 mass %, preferably 3.0 to 10.0 mass %, with respect to the total amount of the ink composition.

Furthermore, in the present invention, when the salt-forming dye and a pigment are used in combination in the oil-based ink composition for a ball-point pen, it is preferable to also pay attention to a pH value in order to keep ink stability over time. This is because the ink composition according to the present invention, which is an oil-based composition, may absorb moisture during production or storage, and water may be contained in the ink composition. In the present invention, a pH value of less than 4.0 is regarded as a strong acid range, a pH value of more than 10.0 is regarded as a strong alkaline range, and a pH of 4.0 to 10.0 is regarded as an intermediate range (weak acid, neutral, and weak alkaline) between the strong acid range and the strong alkaline range.

For the pH of the oil-based ink composition for a ball-point pen of the present invention, a pH value of 7.0 to 10.0 is preferred in consideration of stability over time. Particularly, when a basic carbon black is used as the pigment, a pH value of 7.0 to 10.0 is preferred. This is because a pH value of 7 or more results in improvement of the dispersibility of the basic carbon black while a pH value of more than 10.0 causes an ionic bond in the salt-forming dye to be prone to be separated and therefore results in a tendency to be prone to influence ink stability over time and a color tone. Furthermore, a pH value of 7.0 to 9.0 is preferred in more consideration of ink stability over time.

For the pH value in the present invention, in a measurement method in an oil-based ink composition for a ball-point pen, an oil-based ink is collected in a container, ion-exchanged water is added, the resultant is warmed while being stirred, and left standing to cool after the warming, water in the amount of evaporated water is added, and the resultant is filtrated using filter paper. Using the upper layer of the filtrated filtrate, the pH measurement indicates a value measured at 20° C. using an IM-40S type pH meter manufactured by DKK-TOA CORPORATION.

Ink stability over time can be further improved by combining the salt-forming dye with a salt-forming dye formed of an acid dye and an aromatic amine (hereinafter may be referred to as a second salt-forming dye). The second salt-forming dye has high ionic bonding strength and favorable stability, and is capable of realizing an excellent feeling of writing, a deep-colored written trace, and excellent light resistance when being used in the ink composition, and of further keeping lubricity even under such a high writing pressure that, e.g., a writing load reaches 400 gf. It is presumed that this is because, when the second salt-forming dye is combined with the first salt-forming dye, stability is further improved by the interaction of the dyes.

The aromatic amine is an amine having an aromatic ring such as benzene ring, naphthalene ring, or anthracene ring, and a feeling of writing can be further improved by combining the second salt-forming dye formed of such an amine. It is presumed that there is the effect of suppressing metal-to-metal contact between a ball and a tip body by forming a lubricating film in which the aromatic ring contained in the second salt-forming dye is easily adsorbed on a metal, lubricity is improved, and a feeling of writing becomes favorable. Furthermore, since a synergistic lubricating effect is obtained in a lubricant layer formed of the phenylsulfone or phenyl group in the first salt-forming dye, the pigment particles, and the aromatic ring in the second salt-forming dye, the dyes are most preferably used in combination.

Further, aromatic amines include primary amines, secondary amines, tertiary amines, quaternary amines, and the like, and use of an aromatic quaternary amine is preferred for producing a more stable salt-forming dye for sufficient neutralizing reaction of the acid dye.

Aromatic quaternary amines include benzoxonium compounds, alkyl dimethyl benzyl ammonium compounds, alkyl diethyl benzyl ammonium compounds, and the like, and a benzoxonium compound is preferred in consideration of ink stability over time based on the compatibility of a neutralizing reaction property with the acid dye and a feeling of writing. Specifically, benzoxonium compounds include benzyl bis alkoxy tetradecyl ammonium compounds (e.g., benzyl bis(2-hydroxypropyl)tetradecyl ammonium), benzyldodecyl bis alkoxy ammonium compounds (e.g., benzoxonium chloride, benzyl bis(2-hydroxypropyl)dodecyl ammonium), benzyldecyl bis ammonium compounds (e.g., benzyldecyl bis(2-hydroxypropyl)ammonium), and the like, alkyl dimethyl benzyl ammonium compounds include tetradecyl dimethyl benzyl ammonium compounds, hexadecyl dimethyl benzyl ammonium compounds, octadecyl dimethyl benzyl ammonium compounds, coconut alkyl dimethyl benzyl ammonium compounds, and the like, and alkyl diethyl benzyl ammonium compounds include dodecyl diethyl benzyl ammonium compounds and the like. These may be used singly or in admixture of two or more kinds.

Examples of the acid dye used in the present invention include acid dyes having sulfo group (—SO$_3$H), carboxyl group (—COOH), and the like, and an acid dye having sulfo group (—SO$_3$H) is preferred in consideration of more improvement of lubricity. This is because it is considered that when the acid dye has sulfo group (—SO$_3$H), it is easy to adsorb the group on the surface of the ball or the tip body, a firm lubricant layer is easily formed, and therefore the effect of improving lubricity is great, and because a synergistic lubricating effect is also obtained by using an aromatic amine.

Furthermore, acid dyes include triarylmethane-based acid dyes, azo-based acid dyes, anthraquinone-based acid dyes, oxazine-based acid dyes, and the like. Of these, it is preferable that a triarylmethane-based acid dye or an azo-based acid dye is used, and most preferably, it is preferable that an azo-based acid dye is used, because of forming a stable salt-forming dye with an aromatic amine and being capable of keeping ink stability over time for a long term.

Specific examples of acid dyes include C.I. Acid Black 1, 2, 7, 16, 17, 24, 26, 28, 31, 41, 48, 52, 58, 60, 63, 94, 107, 109, 112, 118, 119, 121, 122, 131, 155, 156; C.I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 79, 99, 111, 114, 116, 122, 135, 142, 161, 172; C.I. Acid Orange 7, 8, 10, 19, 20, 24, 28, 33, 41, 45, 51, 56, 64; C.I. Acid Red 1, 4, 6, 8, 13, 14, 15, 18, 19, 21, 26, 27, 30, 32, 34, 35, 37, 40, 42, 51, 52, 54, 57, 80, 82, 83, 85, 87, 88, 89, 92, 94, 97, 106, 108, 110, 111, 114, 115, 119, 129, 131, 133, 134, 135, 143, 144, 152, 154, 155, 172, 176, 180, 184, 186, 187, 249, 254, 256, 289, 317, 318; C.I. Acid Violet 7, 11, 15, 17, 34, 35, 41, 43, 49, 51, 75; C.I. Acid Blue 1, 7, 9, 15, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 138, 145, 167, 171, 175, 183, 229, 234, 236, 249; C.I. Acid Green 3, 9, 12, 16, 19, 20, 25, 27, 41, 44; C.I. Acid Brown 4, 14; and the like. Further, examples of triarylmethane-based acid dyes and azo-based acid dyes include C.I. Acid Violet 17, C.I. Acid Blue 90, C.I. Acid Blue 9, C.I. Acid Yellow 36, C.I. Acid Yellow 42, C.I. Acid Red 97, and the like. These may be used singly or in admixture of two or more kinds.

Further, since desired lubricity is inhibited when the content of the salt-forming dye of the acid dye and the aromatic amine is less than 0.1 mass % with respect to the total amount of the ink composition while ink is prone to be unstable over time when the content is more than 40.0 mass %, the content is preferably 0.1 to 40.0 mass % with respect to the total amount of the ink composition. The content is more preferably 1.0 to 30.0 mass %, most preferably 5.0 to 20.0 mass %, with respect to the total amount of the ink composition.

The organic solvent used in the present invention can be exemplified by organic solvents that are generally used for oil-based inks for ball-point pens, such as glycol ethers such as ethylene glycol monomethyl ether, ethylene glycol monoethyl ether, ethylene glycol monobutyl ether, ethylene glycol dimethyl ether, ethylene glycol monophenyl ether, propylene glycol monomethyl ether, propylene glycol monoethyl ether, diethylene glycol dimethyl ether, 3-methoxybutanol, and 3-methoxy-3-methylbutanol; glycols such as diethylene glycol, triethylene glycol, polyethylene glycol, propylene glycol, dipropylene glycol, butylene glycol, and ethylene glycol; and alcohols such as benzyl alcohol, methanol, ethanol, 1-propanol, 2-propanol, isopropanol, isobutanol, t-butanol, propargyl alcohol, allyl alcohol, 3-methyl-1-butyn-3-ol, ethylene glycol monomethyl ether acetate, and other higher alcohols. Of these, it is preferable to use an alcohol as the solvent in consideration of dissolution stability with a salt-forming dye of an alkylbenzene sulfonic acid and a basic dye and ink stability with a pigment over time. Furthermore, an aromatic alcohol such as benzyl alcohol is most preferred because of having the effect of improving lubricity. These organic solvents may be used singly or in combination of two or more kinds. The content of the organic solvent is preferably 10.0 to 70.0 mass %, preferably 30.0 to 65.0 mass %, most preferably 45.0 to 65.0 mass %, with respect to the total amount of the ink composition in consideration of the solubility of a coloring agent, a property of drying a written trace, a stain, and the like.

Furthermore, obtainment of a lubricating effect is more facilitated by further using an additional organic amine having an ethylene oxide structure (CH$_2$CH$_2$O) in combination with an aromatic amine in the oil-based ink for a ball-point pen of the present invention. Therefore, it is preferable to use oxyethylene alkylamine, polyoxyethylene alkylamine, or the like, having the ethylene oxide structure. These may be used singly or in combination of two or more kinds.

Specific examples of oxyethylene alkylamine or polyoxyethylene alkylamine include NYMEEN L-201, NYMEEN L-202, NYMEEN L-207, NYMEEN S-202, NYMEEN S-204, NYMEEN S-210, NYMEEN T$_2$-206, NYMEEN S-210, NYMEEN DT-203, NYMEEN DT-208, NYMEEN L-207, NYMEEN T$_2$-206, NYMEEN DT-208 (manufactured by Nippon Oil & Fats Co., Ltd.), and the like. The content of the oxyethylene alkylamine or the polyoxyethylene alkylamine is preferably 0.1 to 10.0 mass %, more preferably 1.0 to 5.0 mass %, with respect to the total amount of the ink composition in consideration of lubricity and stability over time.

Although the ink viscosity of the oil-based ink composition for a ball-point pen of the present invention is not particularly limited, the influence of a stain or ink dripping easily occurs on a written trace when the ink viscosity at 20° C. and a shear rate of 500 sec$^{-1}$ is less than 10 mPa·s, while the rotational resistance of a ball during writing tends to increase to cause a feeling of writing to be heavier when the ink viscosity at 20° C. and a shear rate of 500 sec$^{-1}$ is more than 30000 mPa·s.

Therefore, the ink viscosity at 20° C. and a shear rate of 500 sec$^{-1}$ is preferably 10 to 30000 mPa·s. The ink viscosity is preferably 10 to 5000 mPa·s in more consideration of improvement of a feeling of writing, and most preferably 100 to 3000 mPa·s in more consideration of ink dripping and a feeling of writing.

Further, when the pigment is used in combination of the salt-forming dye of the alkylbenzene sulfonic acid and the basic dye, writing performance may be deteriorated since a pen point dries to form a coating. Thus, addition of a fatty acid to the ink composition may enable the formed coating to be softened and writing performance to be improved. Therefore, it is preferable to add a fatty acid, particularly oleic acid, to the ink composition according to the present invention. Unlike a cap-type writing instrument, in a retractable writing instrument such as a knock-type writing instrument or a rotation delivery-type writing instrument, a state in which a pen point is always exposed to the outside easily influences writing performance, and therefore, it is more preferable to add a fatty acid.

Further, fine particles can be added to the oil-based ink composition for a ball-point pen according to the present invention in order to more improve lubricity. This is because the fine particles enter the gap between the ball and the tip body in the same manner as in the case of the pigment and suppress metal-to-metal contact, whereby lubricity can be improved. Specific examples of fine particles include resin fine particles based on acryl, silicone, polyethylene, and the like, and inorganic oxide particles such as alumina fine particles and silica fine particles. Of these, spherical silica fine particles are preferable. Further, it is preferable that the fine particles are fine particles having an average particle diameter of 5 to 100 nm in consideration of lubricity. As used herein, the average particle diameter is a median diameter, which can be determined by a centrifugal sedimentation manner, a laser diffraction manner, a BET method, and the like.

In addition to the first salt-forming dye, second salt-forming dye, and pigment mentioned above, oil soluble dyes, acid dyes, basic dyes, gold-containing dyes, and combinations of the various salt-forming-type dyes and the like can be adopted as other coloring agents.

In the ink composition according to the present invention, (i) a surfactant, for example, a phosphate ester-based surfactant, a fluorine-based surfactant, a silicone-based surfactant, a fatty acid alkanolamide, an anionic surfactant, a cationic surfactant, an ampholytic surfactant, or a salt-forming body of an anionic surfactant and/or a cationic surfactant, (ii) a viscosity modifier, for example, a resin such as a ketone resin, a terpene resin, an alkyd resin, a phenoxy resin, or polyvinyl acetate, or a pseudoplasticity-imparting agent such as a fatty acid amide or a hydrogenated castor oil, (iii) a coloring agent stabilizer, (iv) a plasticizer, (v) a chelating agent, or (vi) water as a co-solvent may also be appropriately used as another additive in order to improve lubricity and ink stability over time. These may be used singly or in combination of two or more kinds.

Of these, the phosphate ester-based surfactant is preferably used as the surfactant in the ink composition according to the present invention. This is because in the phosphate ester-based surfactant, a phosphate group is easily adsorbed on a metal surface, and the effect of keeping lubricity between the ball and the tip body even under a high writing pressure and of suppressing the wear of the abutment is high. Particularly, when the alkylbenzene sulfonic acid, the basic dye, and the pigment are used in combination as in the present invention, the lubricant layer is formed with a phenylsulfone or phenyl group in the salt-forming dye as mentioned above, and it is considered that the phosphate group facilitates the formation of the firmer lubricant layer. Furthermore, a synergistic effect with a lubrication action due to the pigment particles allows metal-to-metal contact to be more suppressed, whereby keeping of lubricity even under a high writing pressure (e.g., under a condition of a writing load of 400 gf) is facilitated. In addition, a writing characteristic can be further improved in comparison with the case of singly using the fatty acid by combining the fatty acid with the phosphate ester-based surfactant.

Examples of phosphate ester-based surfactants include phosphoric monoesters of polyoxyethylene alkyl ether or polyoxyethylene alkylaryl ether, phosphoric diesters of polyoxyethylene alkyl ether or polyoxyethylene alkylaryl ether, phosphoric triesters of polyoxyethylene alkyl ether or polyoxyethylene alkylaryl ether, alkyl phosphate esters, alkyl ether phosphate esters, or derivatives thereof, and the like. These phosphate ester-based surfactants may be used singly or in admixture of two or more kinds. Of these, the number of carbon atoms contained in an alkyl group is preferably 5 to 15, more preferably 10 to 15. Since the excessively small number of carbon atoms in an alkyl group results in the tendency of insufficient lubricity under a high writing pressure (writing load of 400 gf) while the excessively large number of carbon atoms results in the tendency to easily influence ink stability over time, caution is necessary.

Further, the excessively small content of the phosphate ester-based surfactant results in a tendency to inhibit desired lubricity, while the excessively large content results in a tendency to allow ink to be unstable over time. Therefore, the content of the phosphate ester-based surfactant is preferably 0.1 to 5.0 mass %, more preferably 0.5 to 3.0 mass %, with respect to the total amount of the ink composition.

When the oil-based ink composition for a ball-point pen of the present invention is used in a ball-point pen refill, the structure thereof is not particularly limited, but the oil-based ink composition for a ball-point pen can be used for an oil-based ball-point pen refill comprising a ball-point pen tip including, in a tip body, a ball holding chamber, an ink circulation hole formed in a center of a bottom wall of the ball holding chamber, and a plurality of ink circulation grooves that radially extend from the ink circulation hole, in which a leading end portion of the tip is inwardly crimped, whereby a part of a ball is allowed to protrude from the leading edge of the tip and is rotatably held, the ball-point pen tip being mounted on a leading end of an ink accommodation cylinder directly or via a tip holder, and the oil-based ink composition for a ball-point pen according to the present invention being directly accommodated in the ink accommodation cylinder. In the structure of the ball-point pen tip, without particular limitation, in more consideration of a feeling of writing and the suppression of the wear of the tip body, it is preferable that a generally arc face-shaped abutting surface having a curvature different from that of the ball is disposed on the bottom wall of the ball holding chamber, the ball abuts on the abutting surface, and a first gap that is gradually downsized from a portion closer to the ink circulation hole is formed from the portion closer to the ink circulation hole to the abutment with the ball and the abutting surface, and a second gap that is gradually downsized from a portion closer to the ink circulation hole is formed from the portion closer to the ball holding chamber to the abutment between the ball and the abutting surface, between the ball and the abutting surface.

The first gap and the second gap are formed between the ball and the abutting surface, so that a lubrication state between the ball and the abutting surface is allowed to be prone to be fluid lubrication or mixture lubrication, and the wear of the abutting surface can be suppressed to improve a feeling of writing.

Furthermore, the relationship between the ball and the abutting surface is detailed as follows: it is presumed that the oil-based ink composition for a ball-point pen is dragged from the ink circulation hole into the narrow gap between the ball and the abutting surface by rotation of the ball due to writing, a layer of an ink for a ball-point pen is formed between the ball and the abutting surface, and the layer of the ink results in the so-called wedge effect of generating pressure to generate force for floating the ball, so that the wear of the bottom wall is suppressed. It is presumed that particularly, in the oil-based ink composition in which the first salt-forming dye and the pigment are used in combination as in the present invention, a wedge effect is more easily obtained by an elastic lubrication film layer formed by the interaction between a phenylsulfone or phenyl group in the first salt-forming dye and pigment particles, and therefore there is an effect for suppressing the wear of the bottom wall.

Further, the oil-based ink composition for a ball-point pen is dragged into the narrow gap between the ball and abutting surface due to the rotation of the ball during writing, and the oil-based ink composition for a ball-point pen supplied from a portion closer to the ink circulation hole to the abutting surface and the oil-based ink composition for a ball-point pen that is not able to adhere to paper surface tend to be returned from the ball holding chamber to the abutting surface. Therefore, synergistic improvement of a feeling of writing and wear resistance can be facilitated by forming the first gap and the second gap.

For forming the first gap and the second gap between the ball and the abutting surface, it is important that the shape of the abutting surface is a curved surface shape having a curvature different from the curvature of the ball. Further, since the above-mentioned wedge effect tends to be increased with decreasing the distance of the portion closer to the ink circulation hole in the first gap, it is preferable to lower the gap in the portion closer to the ink circulation hole. Specifically, since the wedge effect is inhibited when the distance of the portion closer to the ink circulation hole, which is a length in a central axis direction, is more than 5 µm, the distance is preferably 5 µm or less, more preferably 0.001 µm to 3 µm, most preferably 0.001 µm to 1 µm. Further, force for floating the ball in the vicinity of the abutment of the ball can be increased to obtain a high wedge effect by allowing the abutting surface to be a generally arc face shape beforehand and forming the first gap to be gradually downsized from the portion closer to the ink circulation hole to the abutment. As a result, the wear of the abutting surface can be effectively suppressed, the sudden wear of the abutting surface is suppressed, and the gap between the ball and the abutting surface is maintained for a long term.

In the present invention, it is preferable to further dispose a lubrication coating layer on the surface of the ball and/or the surface of the abutting surface. In such a structure, contact resistance between the ball and the inner wall of the tip can be significantly reduced to significantly improve the wear resistance of the abutting surface and a feeling of writing by the synergistic effect of fluid lubrication or mixture lubrication due to a lubrication coating layer and the ink composition layer.

As the lubrication coating layer, a conventionally known solid lubricant, such as diamond-like carbon (DLC), tungsten disulfide ($WS_2$), molybdenum disulfide ($MoS_2$), graphite, a fluorine-containing polymer such as tetrafluoroethylene (PTFE), or a silicone resin, or the like can be appropriately used. Examples of methods for coating lubrication coating layers are not particularly limited but include vacuum deposition, ion vapor deposition, physical vapor deposition, chemical vapor deposition, vacuum arc vapor deposition, and the like, and the lubricants without being processed or coating layers that contain the lubricants are acceptable. Of the lubricants, it is the most preferable to particularly use diamond-like carbon (DLC) in consideration of wear resistance and lubricity.

In the present invention, when the viscosity of the ink at 20° C. and a shear rate of 500 sec$^{-1}$ is set in a range of 10 to 5000 mPa·s in order to improve a feeling of writing, it is preferable to make a structure in which any minute gap on the leading end of the tip is closed during non-use, the structure including a valve mechanism in which the ball that is rotatably held in the leading end of the ball-point pen tip is pressed to the inner wall of the leading edge of the tip directly or via a press body by a coil spring, and a gap between the inner wall of the leading edge of the tip and the ball is provided to allow the ink to flow by pressing force during writing, in order to prevent the ink from dripping.

A method for producing a salt-forming dye of an alkylbenzene sulfonic acid and a xanthene-based basic dye will be explained below.

Formulation Example 1

First, in a beaker, 1000 g of water and 30 g of a basic dye (Basic Red 1) were weighed, mixed, warmed, and thereafter dissolved using a disperser stirring machine to obtain a liquid for a dye. Then, 60 g of an alkylbenzene sulfonic acid was weighed and mixed into the liquid for a dye, and the resultant was stirred and allowed to react to synthesize a salt-forming dye. Then, the salt-forming dye was filtrated using filter paper, and a residue on the filter paper was dried to obtain a first salt-forming dye.

Formulation Examples 2 to 6, 11, and 12

As listed in Table 1, salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes (first salt-forming dyes) of Formulation Examples 2 to 6, 11, and 12 were produced by the same method as that of Formulation Example 1 except that each component was changed. The salt-forming dyes were used in examples and comparative examples described below. A salt-forming dye of an acid dye or the like will be explained below.

Formulation Example 7

First, in a beaker, 1000 g of water and 30 g of an acid dye (Acid Violet 17) were weighed, mixed, warmed, and thereafter dissolved using a disperser stirring machine to obtain a liquid for a dye. Then, 60 g of a benzoxonium compound was weighed and mixed into the liquid for a dye, and the resultant was stirred and allowed to react to synthesize a salt-forming dye. Then, the salt-forming dye was filtrated using filter paper, and a residue on the filter paper was dried to obtain a second salt-forming dye.

Formulation Examples 8 to 10, and 13

As listed in Table 1, salt-forming dyes of Formulation Examples 8 to 10, and 13 were produced by the same method as that of Formulation Example 7 except that each component was changed. The dyes were used in examples and comparative examples described below.

TABLE 1

|  |  | Formulation Example | | | | | |
|---|---|---|---|---|---|---|---|
|  |  | 1 | 2 | 3 | 4 | 5 | 6 |
|  | Water | 1000 | 1000 | 1000 | 1000 | 1000 | 1000 |
| Xanthene-based basic dye | Basic Red 1 | 30 |  |  |  | 30 |  |
|  | Basic Red 1:1 |  |  |  |  |  |  |
| Triarylmethane-based basic dye | Basic Blue 26 |  | 30 |  |  |  | 30 |
|  | Basic Blue 7 |  |  |  |  |  |  |
| Azomethlne-based basic dye | Basic Yellow 28 |  |  |  | 30 |  |  |
| Alkylbenzene Sulfonic acid | (1)Dodecyl diphenyl oxide disulfonic acid | 30 | 30 | 30 |  |  |  |
|  | (1) Dodecyl benzene sulfonic acid |  |  |  | 30 | 30 | 30 |

|  |  | Formulation Example | | | | | | |
|---|---|---|---|---|---|---|---|---|
|  |  | 7 | 8 | 9 | 10 | 11 | 12 | 13 |
|  | Water | 1000 | 1000 | 1000 | 1000 | 1000 | 1000 | 1000 |
| Xanthene-based basic dye | Basic Red 1 |  |  |  |  |  |  |  |
|  | Basic Red 1:1 |  |  |  |  | 30 |  |  |
| Triarylmethane-based basic dye | Basic Blue 26 |  |  |  | 15 |  |  |  |
|  | Basic Blue 7 |  |  |  |  |  | 30 |  |
| Azomethine-based basic dye | Basic Yellow 28 |  |  |  | 15 |  |  |  |
| Azo-based basic dye | Basic Red 17 |  |  |  |  |  |  |  |
| Anthraquinone-based basic dye | Basic Blue 60 |  |  |  |  |  |  |  |
| Alkylbenzene Sulfonic acid | (1) Dodecyl diphenyl oxide disulfonic acid |  |  |  |  |  | 30 |  |
|  | (1) Dodecyl benzene sulfonic acid |  |  |  |  | 30 |  |  |
| Triarylmethane-based acid dye | Acid Violet 17 (including sulfo group) | 30 |  | 30 | 30 |  |  |  |
|  | Acid Blue 9 (including sulfo group) |  |  |  |  |  |  | 30 |
| Azo-based acid dye | Acid Yellow 42 (including sulfo group) |  | 30 |  |  |  |  |  |
| Aromatic amine | (2) Benzoxonium compound | 30 | 30 |  |  |  |  | 30 |
|  | (3) Alkyl benzyl dimethyl ammonium compound |  |  | 60 |  |  |  |  |

The present invention will be explained below with reference to examples.

An oil-based ink composition for a ball-point pen of Example 1 was prepared in the following procedure. First, an organic solvent and a pigment dispersing agent were mixed and dissolved at 50° C. using a mixing and stirring machine to produce a solution A. A pigment was added to the obtained solution A to prepare a dispersion using three rolls. The other components were added to the dispersion and stirred at 50° C. using the mixing and stirring machine to obtain an oil-based ink composition for a ball-point pen. The specific formulation amounts are as follows. The viscosity of the ink was 830 mPa·s, measured at a shear rate of 500 sec$^{-1}$ under an environment of 20° C. using AR-G2 (stainless 40 mm 2° rotor) manufactured by TA Instruments. In addition, the measured pH value thereof was pH=7.5.

Example 1

| | |
|---|---|
| Salt-forming dye of Formulation Example 1 | 10.0 mass % |
| Salt-forming dye of Formulation Example 2 | 10.0 mass % |
| Salt-forming dye of Formulation Example 3 | 10.0 mass % |
| Pigment (basic carbon black) | 5.0 mass % |
| Pigment dispersing agent (polyvinyl butyral) | 2.5 mass % |

*-continued*

| | |
|---|---|
| Organic solvent (benzyl alcohol) | 50.1 mass % |
| Stabilizer (polyoxyethylene alkylamine) | 1.0 mass % |
| Stabilizer (oleic acid) | 1.0 mass % |
| Stringiness-imparting agent (polyvinyl-pyrrolidone K90) | 0.4 mass % |
| Resin (ketone resin) | 10.0 mass % |

Examples 2 to 13

Oil-based ink compositions for ball-point pens of Examples 2 to 11 were obtained in the same procedure as that of Example 1 except that each component was changed as listed in Tables 2 and 3. In Example 10, an oil-based ink composition was prepared in the same procedure as that of Example 1 without using water and cooled at room temperature, water was thereafter added thereto, and the resultant was subjected to disperser stirring to obtain the oil-based ink composition for a ball-point pen.

TABLE 2

|  |  | Example 1 |  |  |  |  |  |  |  |
|---|---|---|---|---|---|---|---|---|---|
|  |  | 1 | 2 | 3 | 4 | 5 | 6 | 7 | 8 |
| Salt-forming dye of alkylbenzene sulfonic acid and basic dye | Salt-forming dye (based on xanthene) produced in Formulation Example 1 | 10 | 15 | 30 |  |  | 10 | 10 | 2 |
|  | Salt-forming dye (based on triarylmethane) produced in Formulation Example 2 | 10 | 15 |  |  |  | 10 |  | 8 |
|  | Salt-forming dye (based on azomethine) produced in Formulation Example 3 | 10 |  |  |  |  | 10 |  |  |
|  | Salt-forming dye (based on xanthene) produced in Formulation Example 4 |  |  |  | 10 | 15 |  |  |  |
|  | Salt-forming dye (based on triarylmethane) produced in Formulation Example 5 |  |  |  | 10 | 15 |  |  |  |
|  | Salt-forming dye (based on azomethine) produced in Formulation Example 6 |  |  |  | 10 |  |  |  |  |
|  | Salt-forming dye (based on xanthene) produced in Formulation Example 11 |  |  |  |  |  |  |  |  |
|  | Salt-forming dye (based on triarylmethane) produced in Formulation Example 12 |  |  |  |  |  |  |  |  |
| Salt-forming dye of acid dye and aromatic amine | Salt-forming dye produced in Formulation Example 7 |  |  |  |  |  |  |  | 4 |
|  | Salt-forming dye produced in Formulation Example 8 |  |  |  |  |  |  | 5 |  |
|  | Salt-forming dye produced in Formulation Example 9 |  |  |  |  |  |  |  |  |
|  | Salt-forming dye produced in Formulation Example 13 |  |  |  |  |  |  |  |  |
| Pigment | Basic carbon black (average particle diameter of 100-150 nm) | 5 | 7 | 5 | 5 | 7 | 5 |  |  |
|  | Pigment Red 254 (average particle diameter of 200 nm) |  |  |  |  |  |  | 5 |  |
|  | Pigment Blue 60 (average particle diameter of 100 nm) |  |  |  |  |  |  |  | 5 |
| Pigment dispersing agent | [4] Polyvinyl butyral resin (molecular weight: 19000) | 2.5 | 3.5 | 3 | 3 | 4 |  | 3 | 4 |
|  | [5] Polyvinyl butyral resin (molecular weight: 53000) |  |  |  |  |  | 2.5 |  |  |
| Organic solvent | Benzyl alcohol | 50.1 | 45.1 | 50 | 50.7 | 43.5 | 50.1 | 59.7 | 54.7 |
|  | Water |  |  |  |  |  |  |  |  |
| Surfactant | [6] Phosphate ester-based surfactant (alkyl group having 12 carbon atoms) |  |  |  |  |  |  |  |  |
|  | [7] Phosphate ester-based surfactant (alkyl group having 18 carbon atoms) |  |  |  |  |  |  |  |  |
| Stabilizer | [8] Oxyethylene alkylamine | 1 | 1 | 0.5 | 1 | 0.5 | 1 | 1 | 1 |
|  | Oleic acid | 1 | 1 | 1 | 1 | 1 | 1 | 1 | 1 |
| Stringiness-imparting agent | [9] Polyvinylpyrrolidone K90 | 0.4 | 0.4 | 0.5 | 0.3 | 0.5 | 0.4 | 0.3 | 0.3 |
| Viscosity modifier | [10] Ketone resin | 10 | 12 | 10 | 9 | 13.5 | 10 | 15 | 20 |
| Shear-thinning viscosity-imparting agent | [11] Fatty acid bisamide |  |  |  |  |  |  |  |  |
| Ink viscosity (mPa·S) |  | 830 | 1320 | 1100 | 640 | 2680 | 875 | 1260 | 1180 |
| Evaluations | Feeling of writing | A | A | B | B | B | A | A | A |
|  | Deepness of written trace | A | A | A | A | A | A | A | A |
|  | Light resistance | A | A | A | A | A | A | A | A |
|  | Ink stability over time | A | A | A | A | A | B | A | A |
|  | Pigment dispersibility test | A | A | A | A | A | A | A | A |

TABLE 3

|  |  | Example |  |  |  |  | Reference Example |  |  |
|---|---|---|---|---|---|---|---|---|---|
|  |  | 9 | 10 | 11 | 12 | 13 | 1 | 2 | 3 |
| Salt-forming dye of alkylbenzene Sulfonic acid and basic dye | Salt-forming dye (based on xanthene) produced in Formulation Example 1 | 10 |  |  | 10 |  |  |  |  |
|  | Salt-forming dye (based on triarylmethane) produced in Formulation Example 2 |  |  |  | 10 |  |  |  |  |
|  | Salt-forming dye (based on azomethine) produced in Formulation Example 3 |  |  |  | 10 |  |  |  |  |
|  | Salt-forming dye (based on xanthene) produced in Formulation Example 4 |  | 10 | 15 |  |  |  |  |  |
|  | Salt-forming dye (based on triarylmethane) produced in Formulation Example 5 |  | 10 | 10 |  |  |  |  |  |
|  | Salt-forming dye (based on azomethine) produced in Formulation Example 6 |  | 10 |  |  |  |  |  |  |
|  | Salt-forming dye (based on xanthene) produced in Formulation Example 11 |  |  |  |  | 15 |  |  |  |
|  | Salt-forming dye (based on triarylmethane) produced in Formulation Example 12 |  |  |  |  | 10 |  |  |  |

TABLE 3-continued

|  |  | Example | | | | | Reference Example | | |
| --- | --- | --- | --- | --- | --- | --- | --- | --- | --- |
|  |  | 9 | 10 | 11 | 12 | 13 | 1 | 2 | 3 |
| Salt-forming dye of acid dye and aromatic amine | Salt-forming dye produced in Formulation Example 7 |  |  |  |  |  | 12 |  | 12 |
|  | Salt-forming dye produced in Formulation Example 8 |  |  |  |  |  |  |  |  |
|  | Salt-forming dye produced in Formulation Example 9 | 10 | 10 |  |  |  |  |  |  |
|  | Salt-forming dye produced in Formulation Example 13 |  |  |  |  |  |  | 15 |  |
| Pigment | Basic carbon black (average particle diameter of 100-150 nm) |  | 7 |  |  | 5 |  |  |  |
|  | Pigment Red 254 (average particle diameter of 200 nm) | 5 |  | 5 | 5 |  | 5 |  | 5 |
|  | Pigment Blue 60 (average particle diameter of 100 nm) |  |  |  |  |  |  | 3 |  |
| Pigment dispersing agent | $^{(4)}$ Polyvinyl butyral resin (molecular weight: 19000) | 3 | 3 | 2 | 3 | 2.5 | 3 | 3 | 3 |
|  | $^{(5)}$ Polyvinyl butyral resin (molecular weight: 53000) |  |  |  |  |  |  |  |  |
| Organic solvent | Benzyl alcohol | 52.7 | 38.5 | 48.2 | 47.7 | 48.6 | 62.6 | 61.6 | 59.6 |
|  | Water |  | 3 |  |  |  |  |  |  |
| Surfactant | $^{(6)}$ Phosphate ester-based surfactant (alkyl group having 12 carbon atoms) |  |  |  | 1.5 |  |  |  |  |
|  | $^{(7)}$ Phosphate ester-based surfactant (alkyl group having 18 carbon atoms) |  |  |  |  |  |  |  | 3 |
| Stabilizer | $^{(8)}$ Oxyethylene alkylamine | 1 | 0.5 | 1 | 1 | 1 | 1 | 1 | 1 |
|  | Oleic acid | 2 | 0.5 | 2 | 2 | 1 | 1 | 1 | 1 |
| Stringiness-imparting agent | $^{(9)}$ Polyvinylpyrrolidone K90 | 0.3 | 0.5 | 0.3 | 0.3 | 0.4 | 0.4 | 0.4 | 0.4 |
| Viscosity modifier | $^{(10)}$ Ketone resin | 16 | 7 | 15 | 16 | 10 | 15 | 15 | 15 |
| Shear-thinning viscosity-imparting agent | $^{(11)}$ Fatty acid bisamide |  |  |  | 1.5 |  |  |  |  |
| Ink viscosity (mPa·S) |  | 2160 | 260 | 1860 | 1800 | 850 | 1000 | 1100 | 1050 |
| Evaluations | Feeling of writing | B | B | B | B | A | B | B | B |
|  | Deepness of written trace | A | A | A | A | A | B | B | A |
|  | Light resistance | A | A | A | A | A | A | A | A |
|  | Ink stability over time | A | B | A | A | A | B | B | A |
|  | Pigment dispersibility test | A | B | A | A | A | A | A | A |

Comparative Examples 1 to 4

Formulation was carried out in the same procedure as that of Example 1 except that each component was changed as listed in Table 4, to obtain oil-based ink compositions for ball-point pens of Comparative Examples 1 to 4.

TABLE 4

|  |  | Comparative Example | | | |
| --- | --- | --- | --- | --- | --- |
|  |  | 1 | 2 | 3 | 4 |
| Salt-forming dye of alkylbenzene sulfonic acid and basic dye | Salt-forming dye (based on xanthene) produced in Formulation Example 1 |  | 10 | 15 |  |
|  | Salt-forming dye (based on triarylmethane) produced in Formulation Example 2 |  | 10 | 15 |  |
|  | Salt-forming dye (based on azomethine) produced in Formulation Example 3 |  | 10 |  |  |
|  | Salt-forming dye (based on xanthene) produced in Formulation Example 4 |  |  |  |  |
| Salt-forming dye of acid dye and aromatic amine | Salt-forming dye produced in Formulation Example 8 |  |  |  |  |
| Salt-forming dye of acid dye and basic dye | Dye produced in Formulation Example 10 | 15 |  |  |  |
| Pigment | Basic carbon black (average particle diameter of 100-150 nm) | 5 |  |  | 10 |
|  | Pigment Red 254 (average particle diameter of 200 nm) |  |  |  |  |
|  | Pigment Blue 60 (average particle diameter of 100 nm) |  |  |  |  |
| Pigment dispersing agent | $^{(4)}$ Polyvinyl butyral resin (molecular weight: 19000) | 2.5 | 3 | 2 | 6 |
|  | $^{(5)}$ Polyvinyl butyral resin (molecular weight: 53000) |  |  |  |  |
| Organic solvent | Benzyl alcohol | 60 | 42.5 | 46.7 | 55.7 |
|  | Water |  |  |  |  |
| Stabilizer | $^{(8)}$ Oxyethylene alkylamine | 1 | 1 | 1 | 1.0 |
|  | Oleic acid | 1 | 1 | 2 | 1 |

TABLE 4-continued

|  |  | Comparative Example | | | |
|---|---|---|---|---|---|
|  |  | 1 | 2 | 3 | 4 |
| Stringiness-imparting agent | (9) Polyvinylpyrrolidone K90 | 0.5 | 0.5 | 0.3 | 0.3 |
| Viscosity modifier | (10) Ketone resin | 15 | 22 | 18 | 26 |
| Shear-thinning viscosity-imparting agent | (11) Fatty acid bisamide |  |  |  |  |
| Ink viscosity (mPa · S) |  | 730 | 2160 | 980 | 1820 |
| Evaluations | Feeling of writing | D | C | C | C |
|  | Deepness of written trace | B | D | D | D |
|  | Light resistance | B | D | D | A |
|  | Ink stability over time | D | B | B | B |
|  | Pigment dispersibility test | D | N/A | N/A | B |

Test and Evaluation

An oil-based ink composition 24 for a ball-point pen (0.4 g) produced in each of Examples 1 to 13 and Comparative Examples 1 to 4, and a grease-like ink tracking body 25 were filled into a refill 21 for a ball-point pen, in which a tip 1 for a ball-point pen (stainless rope wire) in which a ball 9 having a ball diameter of φ0.7 mm was rotatably held was mounted on an ink accommodation cylinder 22 (polypropylene), to produce an oil-based ball-point pen. Writing paper JIS P3201 was used as writing test paper to conduct the following test and evaluation.

Figure 2:
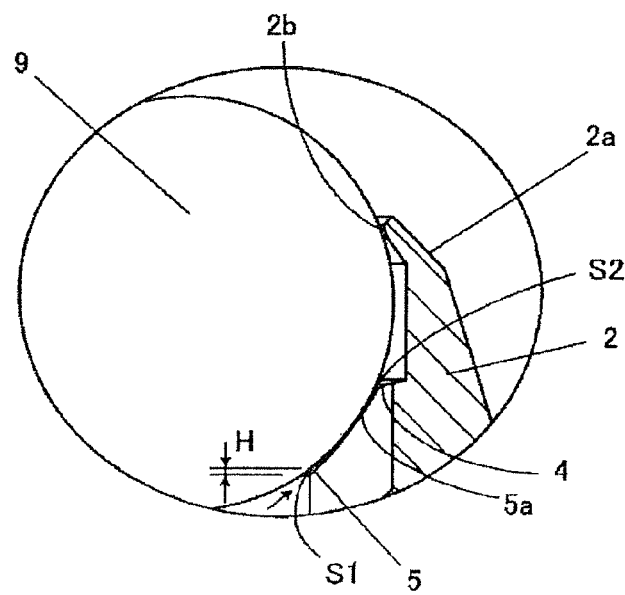
FIG. 2 is an enlarged vertical longitudinal sectional view of a principal part, illustrating the ball-point pen tip of Example 1, of which a portion is omitted.
Figure 3:
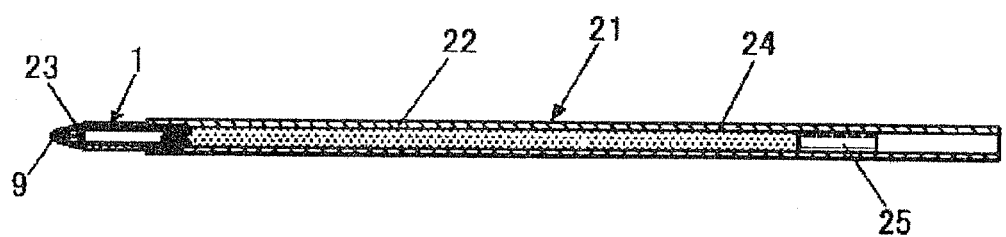
FIG. 3 is a view illustrating a ball-point pen refill in which the ball-point pen tip of Example 1 is used.

In the present invention, the ball-point pen tip 1, which has a structure illustrated in FIGS. 1 and 2, can be used. In the ball-point pen tip illustrated in FIGS. 1 and 2, an ink circulation hole 7 is disposed in the center of a ball holding chamber 3 of a tip body 2 comprising a stainless steel wire rod, a generally arc face-like abutting surface 5 having a curvature different from that of the ball 9 is disposed on a bottom wall 4 in which ink circulation grooves 6 that radially extends from the ink circulation hole 7 and do not reach a tip rear hole 8 are formed, the ball 9 made of tungsten carbide of φ0.5 mm was put on the abutting surface 5, and tip leading end portion 2a is inwardly crimped, whereby the ball 9 is rotatably held so that a part of the ball 9 protrudes from the leading edge of the tip.

Such a ball-point pen tip 1 is produced in such a manner as described below. In other words, a stainless steel wire rod, e.g., of φ2.3 mm and with a hardness of 230 Hv to 280 Hv is cut to a desired length, to make a ball holding chamber 3, an ink circulation hole 7, and ink circulation grooves 6 that radially extend from the ink circulation hole 7. Then, hammering is performed from a portion closer to a tip leading end portion 2a in a state in which a ball 9 is put on a bottom wall 4 of the ball holding chamber 3, a curved surface having a greater curvature radius than that of the ball 9 is formed due to a spring-back property, and thereafter, the tip leading end portion 2a is crimped inwardly. As a result, a curved surface-shaped abutting surface 5 having a curvature different from that of the ball 9 is formed, and the ball 9 abuts on an abutment 5a on a surrounding line around a central axis in a portion closer to the tip leading end portion 2a than a central position of the abutting surface 5 in a central axis direction. As a result, a first gap S1 and a second gap S2 are formed between the ball 9 and the abutting surface 5.

The formation of the first gap S1 and the second gap S2 facilitates maintenance of a lubrication state between the ball 9 and the abutting surface 5 (abutment 5a) in a fluid lubrication or mixture lubrication state. Therefore, the wear of the abutting surface (abutment) is suppressed. In each example, the length H of an opening of the first gap S1 in a central axis direction in a portion closer to the ink circulation hole 7 is 0.9 μm (see FIG. 2).

Feeling of writing: A sensory test by handwriting was conducted to carry out evaluation.

| Very smooth | A |
|---|---|
| Smooth | B |
| Slightly heavy | C |
| Heavy | D |

Deepness of written trace: A trace written by handwriting was observed.

| Deep, clear written trace | A |
|---|---|
| Deep written trace | B |
| Written trace having practically nonproblematic deepness | C |
| Light written trace | D |

Light resistance test: A spiral writing test was conducted on JIS P3201 writing paper A at a writing rate of 4.5 m/min under conditions of a writing angle of 70° and a writing load of 150 g, the paper was left standing for 1 hour, irradiation was carried out using a xenon fade meter X15F (manufactured by Suga Test Instruments Co., Ltd.) until a blue scale reached third-grade discoloration, and a written trace was observed.

| Not discolored or slightly discolored | A |
|---|---|
| Discolored at practically nonproblematic level | B |
| Prominently discolored at practically problematic level | C |

Test of ink over time: The ink in the tip body was microscopically observed with an optical microscope (manufactured by Olympus Corporation) at a magnification of 100 times after a lapse of 2 months at 50° C. and a humidity of 80%.

| Favorable without any precipitates | A |
|---|---|
| Slight generation of precipitates | B |
| Practically nonproblematic generation of precipitates | C |
| Generation of precipitates causing patchiness, poor writing, etc. | D |

Pigment dispersibility test: The pigment dispersibility of the ink composition was observed with an optical microscope (manufactured by Olympus Corporation) at a magnification of 100 times after a lapse of 2 months at 50° C. and a humidity of 80%.

| A pigment was homogeneously dispersed. | A |
| A pigment was substantially homogeneously dispersed. | B |
| A pigment was practically nonproblematically agglomerated. | C |
| A pigment was agglomerated. | D |

In Examples 1 to 13, favorable performances of all of a feeling of writing, the deepness of a written trace, light resistance, ink stability over time, and pigment dispersibility were obtained. In Example 13, the phosphate ester-based surfactant was added to the ink composition of Example 1. When a writing test of a ball-point pen was conducted using the ink composition of each example under a high pen pressure (writing load of 400 gf), a worn portion of the abutment was less than 5 μm in the ball-point pen using the ink composition of Example 13, and a worn portion of the abutment was 5 μm or more and less than 10 μm in the case of using the ink composition of Example 1. In this regard, it was seen that the ink composition of Example 13, containing the phosphate ester-based surfactant, allowed lubricity to be kept and exerted the effect of suppressing the wear of the abutment. In the high-pen-pressure writing test, the evaluation was conducted by measuring the wear amount of the abutment before and after the writing test using a running tester at a load of 400 gf, a writing angle of 70°, and 4 m/min.

In Comparative Example 1, the ink was not stable over time, and the feeling of writing was heavy, since the salt-forming dye of the triarylmethane-based basic dye, the azomethine-based basic dye, and the acid dye was used.

In Comparative Examples 2 and 3, discoloration was prominent, light resistance was at a practically problematic level, and the deepness of the written trace was also poor, since no pigment was used. The feeling of writing was also poor.

In Comparative Example 4, the written trace was not deep, and the feeling of writing was also poor, since no dye was used.

In Reference Examples 1 to 3, only the second salt-forming dye is contained as the salt-forming dye. The ink compositions in these examples are found to have excellent feelings of writing, to offer deep written traces, and to have favorable light resistance, lubricity kept even under a high pen pressure, and the suppressed wear of the abutment. The comparison of Reference Examples 1 and 3 revealed that the wear of the abutment was suppressed by combining the phosphate ester-based surfactant in the ink composition in which the second salt-forming dye was used.

INDUSTRIAL APPLICABILITY

The oil-based ink composition for a ball-point pen according to the present invention can be utilized in oil-based ball-point pens. More specifically, the oil-based ink composition for a ball-point pen can be widely utilized in oil-based ball-point pens of cap- and knock-types and the like, into which the oil-based ink composition for a ball-point pen was filled.

REFERENCE SIGNS LIST

1 Ball-point pen tip
2 Tip body
2a Leading end portion
2b Sealing surface
3 Ball holding chamber
4 Bottom wall
5 Abutting surface
5a Abutment
6 Ink circulation groove
7 Ink circulation hole
8 Rear hole
9 Ball
21 Ball-point pen refill
22 Ink accommodation cylinder
23 Coil spring
24 Ink for ball-point pen
25 Ink tracking body
S1, S2 Gap

The invention claimed is:

1. An oil-based ink composition for a ball-point pen comprising at least a dye, a pigment, and an organic solvent, wherein the dye is at least one salt-forming dye selected from the group consisting of salt-forming dyes of alkylbenzene sulfonic acids and xanthene-based basic dyes, salt-forming dyes of alkylbenzene sulfonic acids and triarylmethane-based basic dyes, and salt-forming dyes of alkylbenzene sulfonic acids and azomethine-based basic dyes, and wherein an ink viscosity at 20° C. and a shear rate of 500 $\sec^{-1}$ of the oil-based ink composition for a ball-point pen is 5000 mPa·s or less.

2. The oil-based ink composition for a ball-point pen according to claim 1, wherein the alkylbenzene sulfonic acid is dodecyl diphenyl oxide disulfonic acid.

3. The oil-based ink composition for a ball-point pen according to claim 2, wherein the pigment is a basic carbon black.

4. The oil-based ink composition for a ball-point pen according to claim 2, further comprising a polyvinyl butyral resin in which a hydroxyl group in a molecule is 20 to 40 mol %.

5. The oil-based ink composition for a ball-point pen according to claim 2, wherein the oil-based ink composition for a ball-point pen has a pH of 7 to 10.

6. The oil-based ink composition for a ball-point pen according to claim 2, wherein the oil-based ink composition for a ball-point pen further comprises a salt-forming dye of an acid dye and an aromatic ring amine.

7. The oil-based ink composition for a ball-point pen according to claim 1, wherein the pigment is a basic carbon black.

8. The oil-based ink composition for a ball-point pen according to claim 7, further comprising a polyvinyl butyral resin in which a hydroxyl group in a molecule is 20 to 40 mol %.

9. The oil-based ink composition for a ball-point pen according to claim 7, wherein the oil-based ink composition for a ball-point pen has a pH of 7 to 10.

10. The oil-based ink composition for a ball-point pen according to claim 7, wherein the oil-based ink composition for a ball-point pen further comprises a salt-forming dye of an acid dye and an aromatic ring amine.

11. The oil-based ink composition for a ball-point pen according to claim 1, further comprising a polyvinyl butyral resin in which a hydroxyl group in a molecule is 20 to 40 mol %.

12. The oil-based ink composition for a ball-point pen according to claim 11, wherein the oil-based ink composition for a ball-point pen has a pH of 7 to 10.

13. The oil-based ink composition for a ball-point pen according to claim 11, wherein the oil-based ink composition for a ball-point pen further comprises a salt-forming dye of an acid dye and an aromatic ring amine.

14. The oil-based ink composition for a ball-point pen according to claim 1, wherein the oil-based ink composition for a ball-point pen has a pH of 7 to 10.

15. The oil-based ink composition for a ball-point pen according to claim 14, wherein the oil-based ink composition for a ball-point pen further comprises a salt-forming dye of an acid dye and an aromatic ring amine.

16. The oil-based ink composition for a ball-point pen according to claim 1, wherein the oil-based ink composition for a ball-point pen further comprises a salt-forming dye of an acid dye and an aromatic ring amine.

17. The oil-based ink composition for a ball-point pen according to claim 16, wherein the aromatic ring amine is one or more selected from the group consisting of benzoxonium compounds, alkyl dimethyl benzyl ammonium compounds, and alkyl diethyl benzyl ammonium compounds.

18. An oil-based ball-point pen refill comprising a ball-point pen tip including, in a tip body, a ball holding chamber, an ink circulation hole formed in a center of a bottom wall of the ball holding chamber, and a plurality of ink circulation grooves that radially extend from the ink circulation hole, in which a leading end portion of the tip is inwardly crimped, whereby a part of a ball is allowed to protrude from the leading edge of the tip and is rotatably held, the ball-point pen tip being mounted on a leading end of an ink accommodation cylinder directly or via a tip holder, and the oil-based ink composition for a ball-point pen according to claim 1 being directly accommodated in the ink accommodation cylinder, wherein a curved surface-shaped abutting surface having a curvature different from the curvature of the ball is disposed on the bottom wall of the ball holding chamber, the ball abuts on an abutment which is a part of the abutting surface; and a first gap that is gradually downsized from a portion closer to the ink circulation hole is formed from the portion closer to the ink circulation hole to the abutment, and a second gap that is gradually downsized from a part closer to a leading end of the ink circulation grooves is formed from the part closer to the leading end of the ink circulation grooves to the abutment, between the ball and the abutting surface.

19. The oil-based ball-point pen refill according to claim 18, wherein a lubrication coating layer is disposed on a surface of the ball and/or on a surface of the abutting surface.

* * * * *